United States Patent
Peterson

[15] 3,662,974
[45] May 16, 1972

[54] AIRCRAFT STRUCTURE UNIT AND WING STRUCTURE

[72] Inventor: Adolphe C. Peterson, 4623 Bruce Avenue South, Minneapolis, Minn. 55424

[22] Filed: Sept. 12, 1967

[21] Appl. No.: 667,222

[52] U.S. Cl. ................................................244/46, 244/43
[51] Int. Cl. ............................................................B64c 3/40
[58] Field of Search ..............................................244/43, 46

[56] References Cited

UNITED STATES PATENTS

| | | | |
|---|---|---|---|
| 2,511,265 | 6/1950 | Hoopingarner et al. | 244/46 |
| 2,683,574 | 7/1954 | Peterson | 244/46 |
| 2,741,444 | 4/1956 | Baynes | 244/46 |
| 2,752,110 | 6/1956 | Peterson | 244/43 |
| 2,794,608 | 6/1957 | Johnson | 244/46 |
| 2,822,995 | 2/1958 | Bowen | 244/46 |
| 3,018,985 | 1/1962 | Voigt | 244/46 |

*Primary Examiner*—Trygve M. Blix
*Assistant Examiner*—Jeffrey L. Forman

[57] ABSTRACT

This is an aircraft having variable wing formation of novel form, one formation for landing and take-off performance and another formation for cruising speeds. A novel form of wing actuation for such formation and a form of control for actuation is included. A novel form of structure of the aircraft especially for this means is a part of the structure, and a novel form of airfoil formation for flight control is a part of this aircraft.

7 Claims, 15 Drawing Figures

Patented May 16, 1972

INVENTOR.
ADOLPHE C. PETERSON

Patented May 16, 1972

INVENTOR.
ADOLPHE C. PETERSON

Patented May 16, 1972

3,662,974

4 Sheets-Sheet

INVENTOR.
ADOLPHE C. PETERSON

Patented May 16, 1972

INVENTOR.
ADOLPHE C. PETERSON

AIRCRAFT STRUCTURE UNIT AND WING STRUCTURE

My invention relates to aircraft and especially to a means and system of structural support and wing means and it is therefore called—aircraft structure unit and wing structure.

The chief objects of my invention are to provide an aircraft which is especially suited by its structure and wing means and the structure thereof for the very high speed type of air travel, such as the aircraft having speeds of near sonic speed and such as have speeds which exceed sonic seed and especially such as have speeds which are as much as twice speed or even more; and to provide also a form of variable wing means for such aircraft which variable wing means shall have such form and manner of cooperation that the resulting wing form for flight shall have greater efficiency in flight, especially super-sonic flight, than such forms as have been proposed.

A very important feature of this aircraft is that a pivoted swing-wing type of sustentation shall have mounting means and correlation of a pair of wings such that the pair are enabled to be arranged for either slow speed landing operation or high speed flight so that the pair of by its conformation forms a structure having the least drag in flight and having the best efficiency for flight at very high speed. Another objective is that such variable wing means shall be of such type and conformation that it may be more readily designed and manufactured at lesser cost, and that such a structure shall have greater relative strength in flight than such constructions as are presently available. Another objective is that this aircraft may have supplemental trailing wing means which shall enable better control of such an aircraft at both high and low speeds, and which may also provide supplemental sustentation for the aircraft.

A very important objective is that the aircraft may be constructed to have a very strong and also a very readily and economically manufactured supporting frame structure between the main wing structure and the fuselage cargo or passenger carrying structure so that the composite structure may be considerably less costly while at the same time having increased efficiency in its use for sustentation flight. Incidentally an objective is such design of the structure that the fuselage passenger or cargo structure is in the entirety more readily and economically constructed. Incidentally also is design which integrally with the structure provides longitudinally stabilizing means which by such provision lessens the cost and also the weight of additional structure for such stabilization. In general the objective of this aircraft is provision of a design of the structure such that the aircraft of sonic or super-sonic type and also those of lesser speeds may be more easily designed and constructed and more suitable by the resulting design for travel,whether it be that of the military type or the commercial type of aircraft.

In the accompanying drawings which illustrate my invention, like characters refer to like parts throughout the views insofar as is permissible. Referring to the drawings:

FIG. 1 is a view from above of an aircraft including fuselage and embodying my invention;

FIG. 2 is a side elevation of such aircraft;

FIG. 3 is a side view of the main structural unit, a structure frame of length approximately that of the aircraft;

FIG. 4 is a section transversely of the aircraft showing chiefly a cross section of the structural unit with the fuselage shell applied and the mounting of the pivot means of the wing structure;

Figure 1:
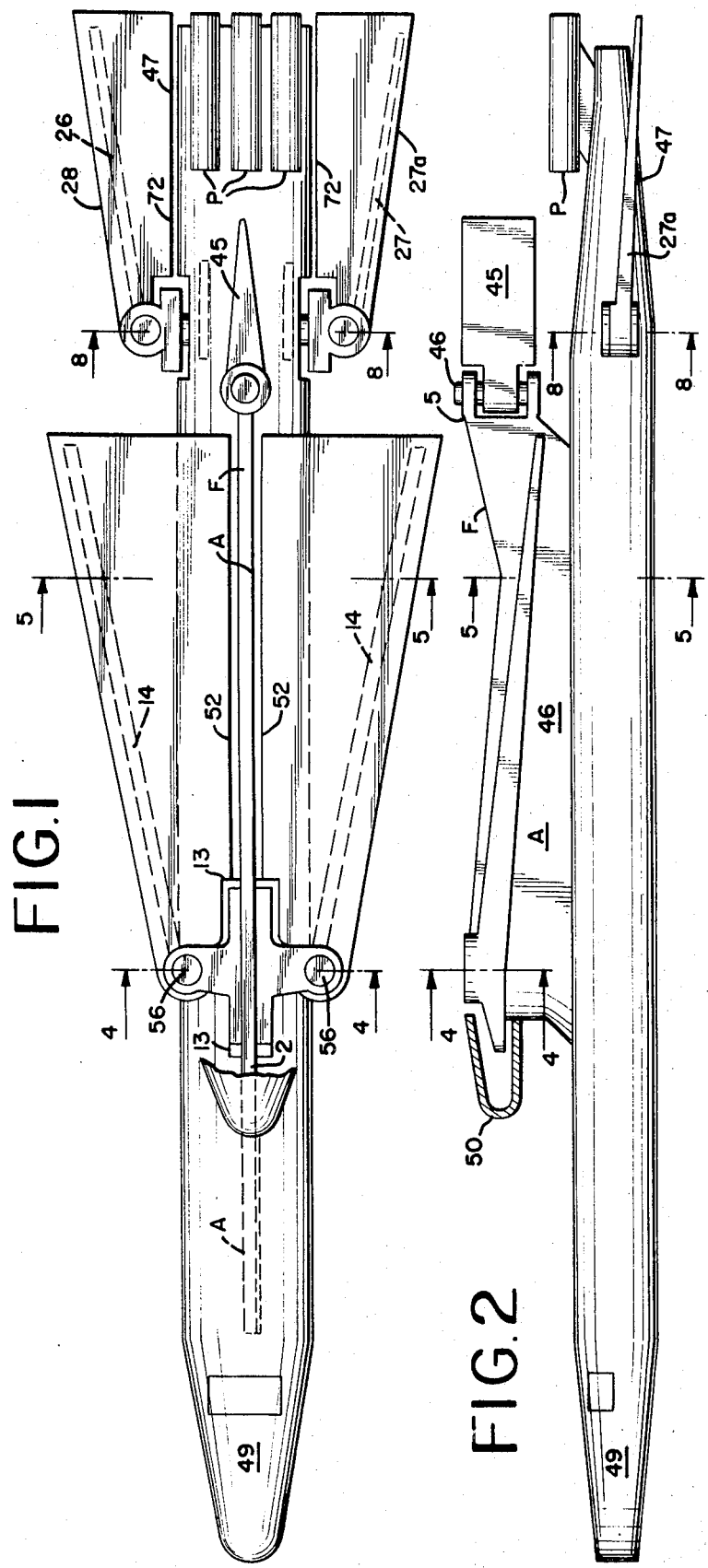
FIGS. 1, 2, 3, 4, 5 show the general structure and application of detailed units,and of these figures.
Figure 2:
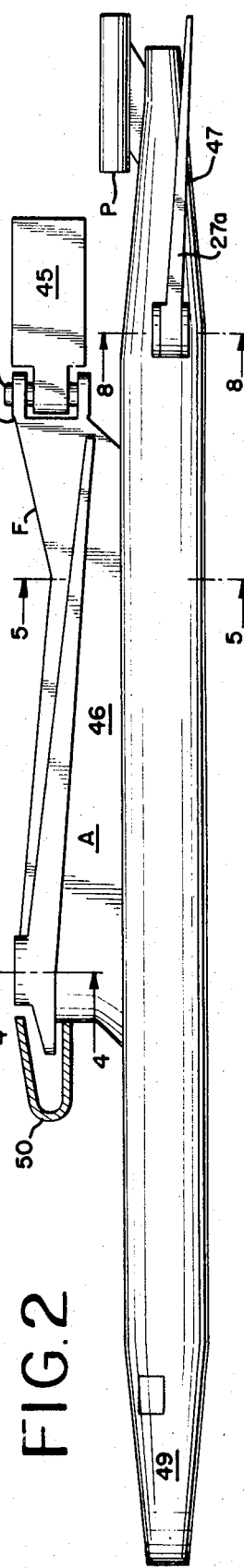
Figure 3:
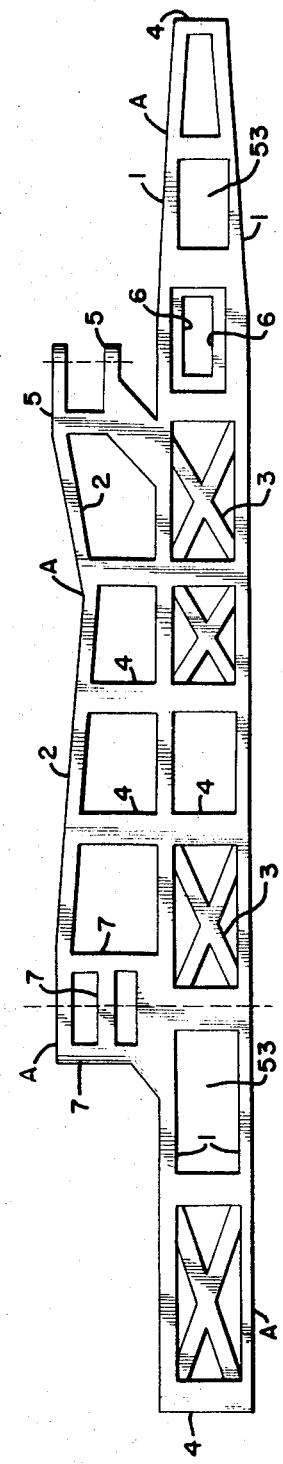
Figure 4:
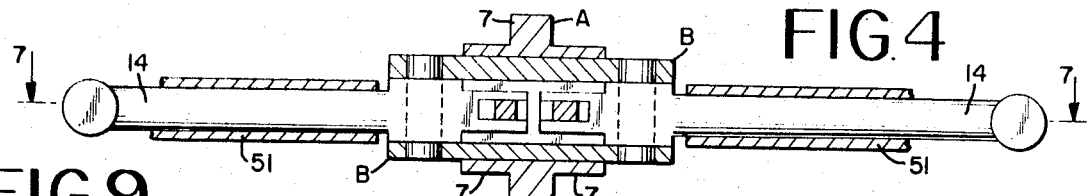
Figure 5:
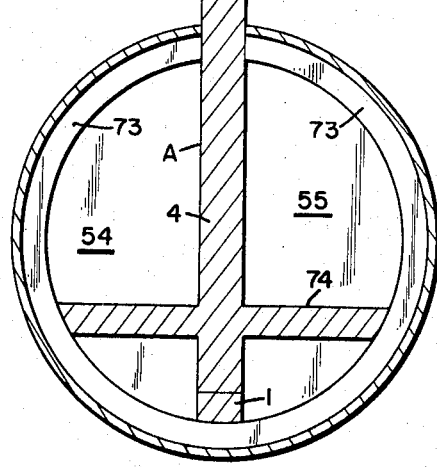
Figures 6, 7, 10:
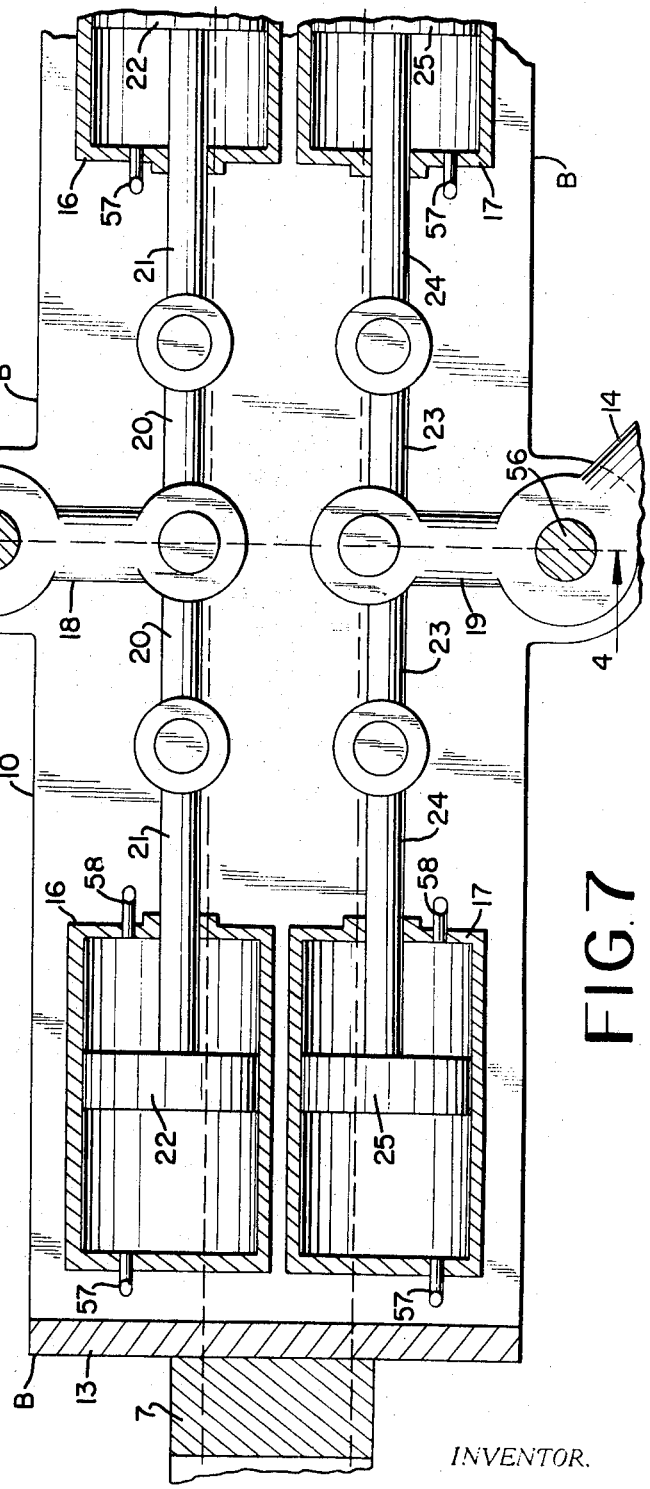

FIG. 4 being on the line 4—4 of FIGS. 1 and 2, looking rearwardly;

FIG. 5 being on the line 5—5 of FIGS. 1 and 2 looking rearwardly;

FIG. 4 being somewhat enlarged;

FIG. 6 being on a lesser scale in size;

FIG. 5 a section transversely.

FIGS. 6 and 7 are enlarged detailed views;

FIG. 6 being on the lines 4—4 of FIGS. 1, 2, 7;

FIG. 7 being on a horizontal plane on line 7—7 of FIGS. 6 and 4.

Figure 9:
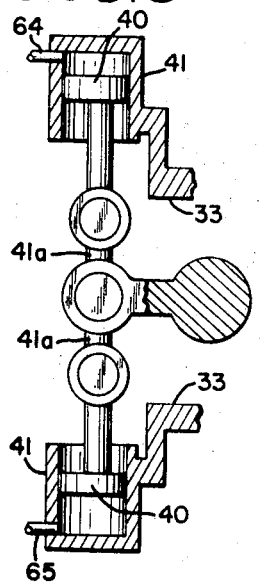
Figure 8:
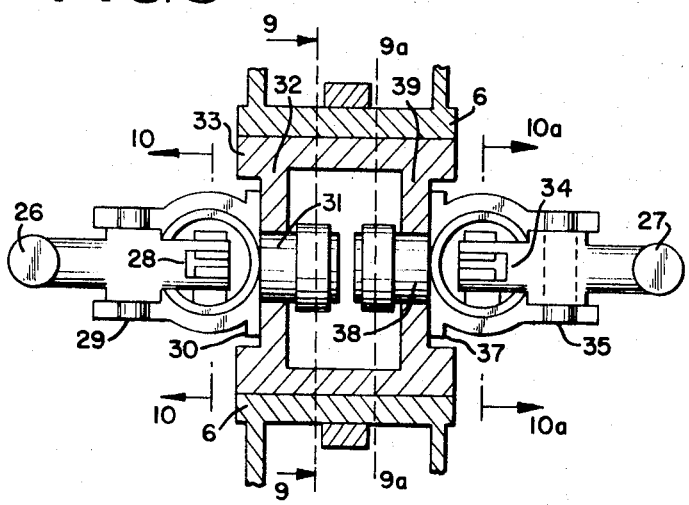

FIGS. 8, 9, 10 are sectional views (chiefly),

FIG. 8 on lines 8—8 of FIGS. 1, 2;

FIG. 9 being on line 9—9 of FIG. 8;

FIG. 10 being on line 10—10 of FIG. 8.

A section on line 9a—9a of FIG. 8 would be similar to FIG. 9 and a section on line 10a–10a would be similar to FIG. 10.

Figure 11:
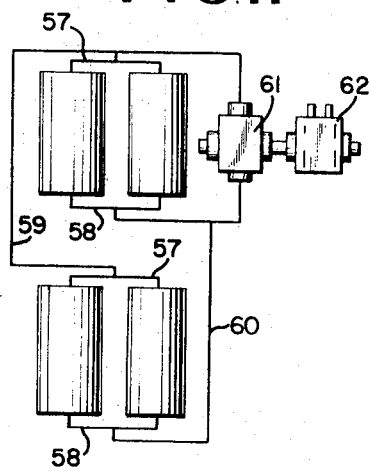

FIG. 11 is a diagrammatic view showing a fluid control means for one of the fluid operated controls for the wing movements in control operation, namely the main wings.

Figure 12:
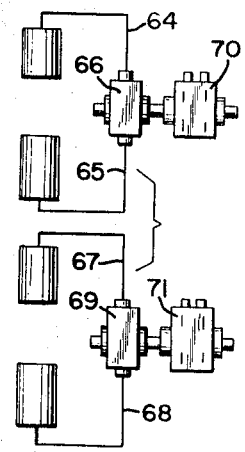

FIG. 12 shows the fluid control means for one supplemental wing in diagrammatic view. A similar control means for the other supplemental wing is not shown.

Figure 13:
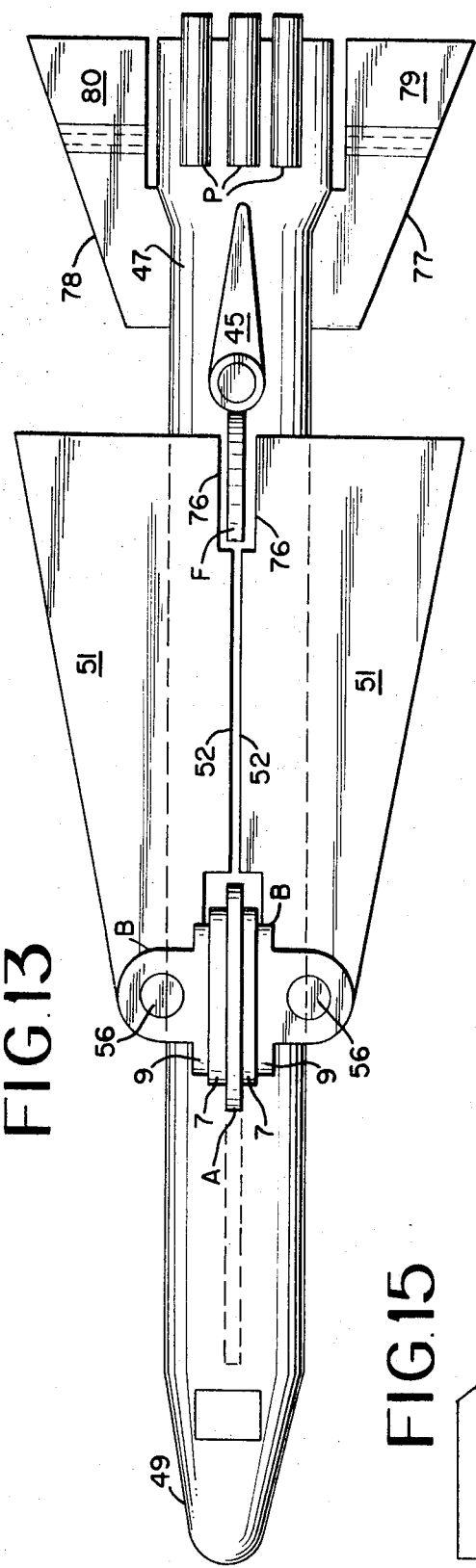
Figure 14:
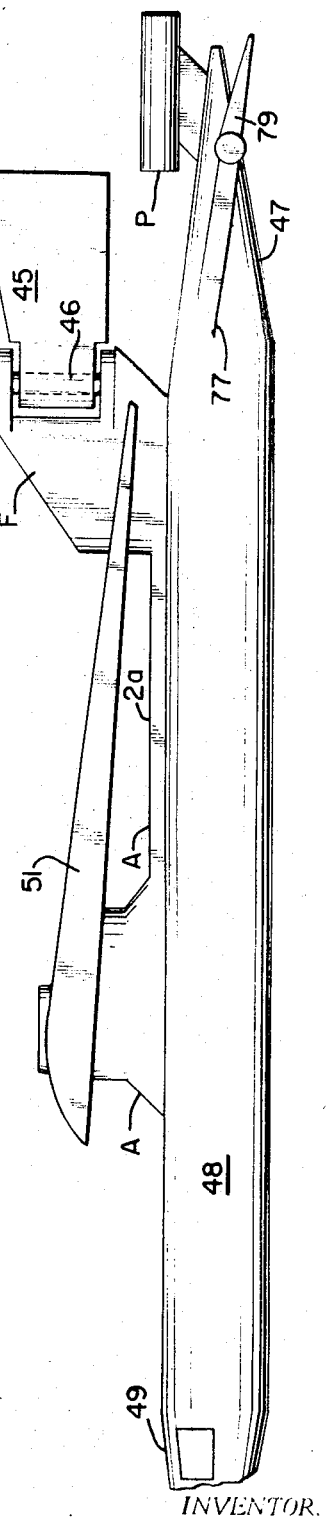

FIGS. 13, 14 show a modified form of the invention.

Figure 15:
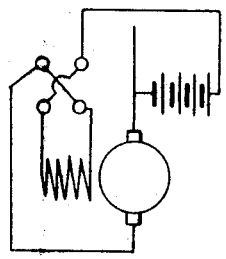

FIG. 15 shows a reversing switch.

Referring first to FIGS. 1, 2, 3, 4, 5 these figures show the combined wing and fuselage structure on a greatly reduced scale, the detailed units being merely diagrammatically shown so as to show their relative positions. In these figures there is shown particularly the main structural unit, which is what unites the main wing structure and the fuselage structure, and this structure gives strength and supporting mounting to the other main components of the aircraft, and this is called the main structural. This unit is generally designated as A to include its components and these components include fuselage beams 1, fin beam 2, vertical posts 4 between the horizontal beams 1 and horizontal fin beam 2, the elements 3 which are angled to the others, the wing pivoting mounting members 7, the rudder pivot mounting members 5, the supplemental wing mounting members 6. All these members or elements 1, 2, 3, 4, 5, 6, 7 are formed of any suitable material of great strength and durability, and all of these members are firmly and rigidly secured and united together by any means as by welding, bolting, bracket means, rivetting, and any other means which may give strength to the structure without excessive weight, so that all these elements together constitute one firm and rigid unit which serves as the structural uniting frame for all other means or elements which constitute the complete aircraft, and this entire unit is accordingly designated the main structural unit. Any steel alloy, titanium or other alloy of material of sufficient strength and rigidity may be used for this structural unit. The elements designated 1, 2, 3, 4, 5, 6, 7 may be made indivudually of box type or any type girders or form which gives strength with least weight. In the main structural unit as described, there are mounted chiefly, the main wing means, supplemental wing means, rudder means, propulsion means, and such as usually provided for passengers or cargo. The main wing means is first described and this comprises the main pivot structure, wing actuation motor means, the pair of wings which are of the variable location or swing-wing type.

To construct the main wing means and support it, there is a bearing fixture B which is of box-like form having an upper bearing plate 9, a lower bearing plate 10, upper bearings 11, lower bearings 12, verticals 13, and all of these form a bearing structure for support of the wing spars 14, 14, by their firmly attached pivot pins which may oscillate in the bearings 11 or 12, and the fixture generally designated as B forms also a means of mounting this pivot means in the main structural unit above described by uniting the members 10, 9, 13 by bolting or welding with the members 7 of the main structural unit A. The bearing fixture B has also fixed within it and secured firmly to it by supports 15, the four cylinders, a pair 16, and a pair 17, the pair 16 being associated with one spar crank 18 and the pair 17 being associated with the spar crank 19, the spar cranks being respectively formed with and firmly a part of the wing spars 14, 14, the spar cranks being operatively connected through connecting rods 20 and piston rods 21 with piston 22 of the pair of cylinders 16, and through connecting rods 23 and piston rods 24 with pistons 25 of the pair of associated cylinders 17. Thus there are two cylinders having pistons which may actuate the spar cranks of one wing spar 14 and two other cylinders having pistons which may actuate spar cranks of the other wing spar 14. One pair of pistons 22 serves to actuate one wing spar 14 and the other pair of pistons 25 serves to actuate the other wing spar 14 and control means as hereinafter described is provided so action is coordinated.

The actuation means of the supplemental wing means is now described. The supplemental wing means has as a mounting means for the pivoting wing spars which are designated respectively 26 and 27, there being in this case two sets of actuation or control means for the supplemental wing spars, one set for spar 26 and the other set for spar 27, and each of these two sets has individually two pressure actuated motor means one for one type of movement of the wing spar associated, and another pressure actuated motor means for another type of movement of the associated wing spar. That is each wing spar is capable of two different actuation movements, one being an oscillation movement of one wing spar with its spar crank 28 about the pivot 29 to swing the wing spar 26 with its wing surfaces in a plane which is in or near the horizontal plane; the other movement being the oscillation of the mounting 30 for the pivot 29 on its axis shaft 31 which is oscillatively mounted in the bearing 32 formed as a part of the supplemental wing fixture 33, this being as relates to the one supplemental wing spar 26. The other wing spar 27 is likewise capable of the two different movements, one being an oscillation movement of the wing spar 27 with its spar crank 34 about the pivot 35 to swing the wing spar 27 about the pivot 35 to swing the wing spar 27 with its wing surfaces in a plane which is in or near the horizontal plane; the other movement being the oscillation of the mounting 37 for the pivot 35 on its axis shaft 38 which is oscillatively mounted in the bearing 39 formed as a part of the supplemental wing fixture 33, this relating to supplemental wing spar 27.

The movements of wing spars 26 or 27 in the near horizontal plane is procured by movements of two pistons 40 in cylinders 41 which by connecting rods 41a may oscillate the associated spar crank in the near horizontal plane. The movements of wing spars and their mounting on the axis shaft 31–38 is procured by two pistons 42 in cylinders 43 which movement by connecting rods 43 oscillates axis shaft crank 44 to oscillate axis shaft 38 or 31 thereby the attached pivot and wing spar.

Each of the wing spars 26 and 27 has the oscillations movements (two types) as above described, and each wing spar 26 and 27 has the two sets of cylinders and associated pistons and spar cranks, and axis shaft cranks and connecting rods individually associated with the wing spar, that is either 26 or 27 and each of these sets of actuation means is individually controlled by conduits and fluid means as hereinafter described, to individually control the two supplemental wing spars 26 and 27. Figures on the line 9a and 10a are substantially similar to the FIGS. 9 and 10 as to the wing spars 26 and 27, and therefore only the one set is pictured as in FIGS. 9 and 10. The cylinders and pistons controlling the oscillation of the axis shafts and their wing spars operate by reciprocation in a plane which is parallel to that of the section in FIG. 8 through the fixture 33, that is, this plane is at right angles to the plane of the axes of the cylinders associated with oscillation movement of the spar cranks about their pivots.

The rudder 45 is pivotably mounted on the bearing means 46 which is mounted in members 5 of the main structural unit. Any means (not shown) such as customarily provided in aircraft, may be used for control and movement of the rudder 45, on its pivot. Propulsion units, each designated by letter P are mounted securely on the trailing end 47 of the fuselage, their support being by firm connection with the trailing end of the main structural unit. Three such propulsion means, each of which will be such as turbine jets, turbine air fans, or other propulsion means are shown in FIG. 1, it being noted that any suitable number and any suitable location mounting may be adopted for such propulsion means. Any suitable landing gear means will be mounted in the fuselage structure , to provide means for landing on air-port run-ways or carrier run-ways, this means being not shown, as such means are commonly used in aircraft.

The beam members 2 and posts 4 provide mounting for surface plate or skin 48 which encloses the structural members 2 and 4 and forms a streamlined fin which has mounted thereon the pivot and actuation means for the main wings and also provides a stabilizing longitudinal fin which is in the direction of flight and stabilizes such flight, and the rudder described is also mounted thereon. The pilots cabin is provided at the forward end of the fuselage, and located at 49. At the forward end of the main wing structure there is a streamlined leading cap formed and supported on the main structural unit, this being designated 50 and forming a shield and streamline lead for the pivotal structure of the main wing. The main wings, surfaces designated 51 formed on the wing spars 14 and 14 is supported by such forming and strengthening structure as is customary in aircraft wings. As shown in FIGS. 2, 1, and 5 the main wings will in the high speed formation or location have longitudinally of the aircraft a rearwardly descending inclination such that they will in high speed formation provide adequate lift sustentation in high speed flight. As shown in FIG. 5 the main wings, as they are located in the trailing (high speed) formation will individually have an inclination transversely (FIG. 5) so that each individually inclines downwardly in the direction of the fin designated F and as on the beam 2 and posts 14, so that in trailing location each of the main wings is closely adjacent fin F and fixed against further movement across the intermediate plane and so that the adjacent trailing edges (longitudinally) 52 are substantially parallel each to the other and thus form with the rest of the wing surface an efficient sustentation airfoil for high speed flight at speed such as super-sonic. The main wings may have ailerons formed therewith but this may be dispensed with as such functions are served at least in part by the supplemental wing structure. FIG. 5 shows passenger seats on ether side of the main structural unit, and several openings in the unit (designated 53) provide for passage between the two fuselage sections 54 and 55.

Referring to FIG. 7 which shows the pivoting or swing actuating means for the main wings and their spars 14 and 14, each of the four cylinders of the fluid actuating means for movement oscillation of the spar cranks 18 and 19 has conduits delivering thereto or exhausting therefrom, there being a conduit to each end of the cylinder (each thereof). The pistons associated with the cylinders will all move at any one time in the same direction so as to secure coordinated swing of the main wings on their pivots which are each designated 56 and to procure such coordinated movement the conduits 57 are all connected for flow either direction to or from a control conduit 59 and the conduits 58 (four) are all connected for flow either direction to or from a control conduit 60. Two of the conduits 58 are not shown in FIG. 7 as the associated two cylinders are there shown only in part, these cylinders are however shown diagrammatically in full in the diagrammatic FIG. 11. Referring to FIG. 11 the two control conduits 59 and 60 are shown as connected to opposite sides of a reversible pump 61, the latter being operable by an electric motor 62 which is a reversible motor and when operated flow will be from similarly directed ends of cylinders to the pump 61 and thereby to the opposite similarly directed ends of the cylinders, the result being that the flow at any time (under control) will be to force all the four pistons 22 and 25 in the same direction, and according to that control. The reversible electric motor will be controlled by a reversing switch means as in FIG. 15, or by any substitute form of electric circuit control which may procure the coordinated movement by the flow and according to its direction of flow.

Referring to FIGS. 8, 9 and 10, each of the supplemental wing spars 26 and 27 has the two pivoting movements on pivot means, one being the swing-wing movement ,the other being the oscillation of its axis shaft (either of the two), and to procure these control movements, there is for each wing spar 26 and 27 the fluid operated means, as in FIG. 9 and that as in FIG. 10.

The two conduits 64 and 65 FIG. 9 are connected to opposite sides of a reversible pump 66 FIG. 12, and the two conduits 67 and 68 are connected to opposite sides of a reversible pump 69. The pump 66 is operable by reversible electric motor 70 and the reversible 69 pump is operable by the reversible electric motor 71. The reversing control is by an electric and switch control as shown in FIG. 15 or by any type of reversing control means as may commonly be used for reversible control and operation of electric motors. The reversible pump 69 is shown in FIG. 12.

The general operation and use is now described. The FIGS. 1 and 2 show the aircraft in the positions or locations for cruising speed, high speed sub-sonic or super-sonic flight, both the main wings and the supplemental trailing wings being the retracted to the positions where they trail from their pivots which have been described. In these positions the wings, main and supplemental are positioned so that the transverse width across the widest part of the wing structure is the least possible, the main wings being contracted so that the sides 52 are separated by a distance which is no more than the width of the beam 2 with its sheet metal covering , and the supplemental wings have their sides 72 as closely adjacent the fuselage structure as is permissible to allow adjustment upward and downward, individually, and the sides 72 are parallel each to the other. In normal cruising travel all the main and supplemental wings are located so in the trail position they have the descending location relative to the direction of flight, and provide sustentation thereby. Sides 52 are also parallel.

Assuming that the aircraft is grounded on an air-port or carrier deck, the main wings by their inclinations to the horizontal as shown in FIG. 5 are in position to be extended from the fuselage or member A (the fin) and the main wings therefore then will be in line transversely across the aircraft and the supplemental wings are also as a pair similarly extended. For take-off and slow travel they are maintained in the extended positions, in-line positions, by the force of pressure of liquid in the cylinders of the control means for each of the sets of wings, it being contemplated however that any other and additional means may be incorporated with the devices to maintain the positions selected. The propulsion means P being place in propulsion condition and controlled will then impart sufficient speed of travel forwardly so that the sustentation and lift effect of the wings main and supplemental then cause upward movement of the aircraft. When the aircraft has attained a sufficiently upward travel course and the speed has accelerated to a sufficiently high speed, the pilot may then cause the main wings and the supplemental wings to be retracted, so that the main wings occupy the trailing positions (from their pivots) as shown in FIG. 1 and 2, and so that the supplemental wings occupy the trailing positions, as shown FIGS. 1 and 2. These retracted positions are attained by manual change of the electric control for the electric motors associated with the pumps described, so that the liquid contained in the pumps moves to the chambers (on sides of the pistons) which will procure movements to the retracted positions.

In cruising flight or in take-off or high speed flight, the pilot (or any automatic means) may by the electric motors individually associated with pumps 66 or 69 cause the liquid in the control circuits associated with either wing 27a or 28 to move to the chamber associated to move either the one piston or another of the pistons 40 to procure a guiding control movement of the proper supplemental wing to cause a decreased or increased lift effect of the particular supplemental wing 27a or 28, this being procured by oscillation in either direction of the axis shaft associated with the particular supplemental wing 27a or 28. The oscillation of the axis shafts individually under control may be effected in such manner at any time whether the supplemental wings 27a, 28 are extended or in trail positions.

For landing or slow travel the pilot may cause the main wings and the supplemental wings to be extended as has been indicated. The FIGS. 8, 9, 10, 12 and others show the actuation means and the control means for the supplemental wings, so that they may be individually controlled as to both oscillating movements, but it is contemplated that the extension swings of wings 27a and 28 may be coordinated, such control for the oscillation of the axis shafts so the said oscillation may be effected in coordinate manner is as diagrammatically shown in FIG. 11. The control cylinders and conduit circuits may be filled with a liquid as oil or may be filled under pressure with a gaseous fluid, but it is preferable that a liquid such as oil be used in the control cylinders.

The main wings in their locating swing movement about their pivot means may have as to each a swing movement which may be through about 90° or slightly less of the circle about the axis, so that the two main wings in extended positions may be as to their spars approximately in line transversely of the fuselage structure. The supplementary wings move on pivots 29 and 35 which may be approximately 90° or somewhat less. The supplemental wings 27a, 28 may have a degree of oscillation on their horizontal axis shafts 31 and 38 of about 30° to 45° and that may serve to permit placing of the wings 27a, 28, either individually, at an angle of say 30° or more flight direction either above or below the line of flight direction, this permitting directional control in the flight plane vertically, and individual change of either one for equilibrium control. There may be any indicating means cooperative with any of the wing pivoting elements. Any supplemental or other aileron control may be used for equilibrium control or elevation control.

As shown in FIGS. 4 and 5 ribs as 73 are secured to either side of the main frame structure A for affixture of shell 48 and these ribs will provide the fuselage body in conjunction with main frame structure A. A floor structure 74 firmly secured to main frame structure A gives additional strength to the ribs 73 and the shell thereon but also gives stability in the horizontal plane to the main structural frame A. Passenger seats 75 are provided on each side of the main structural frame A or the spaces 54, 55 may be for cargo.

Referring now to the FIGS. 13 and 14, these show a slightly different association of the pair of main swing-wings with the fin structure F and with the main structural frame A. This form is in all structural detail similar to that of the first form shown, but in this form the upper beam member is in part as at 2a lowered away from the pair of swing-wings and their spars 14—14, although the structural frame A has the mounting 7 of the unit A retained in substantially similar location as in the first form so that the mounting 7 will have in it the bearing member B as in the first form to support the spars in their pivot means as in the first form. The fin F in this form is eliminated in part of its length, that is intermediately of the mounting 7 and the rearward located fin F which constitutes a stabilizing longitudinal fin and also a pivotal support for the rudder 45 and also a dividing barrier or limiting member for the wing spars 14—14 by the interposition as a stop for the movement (pivoting) of the pair of wings so that the two wings may move in retraction to the position as in FIG. 13 for location thus by the impact of the two rearward portions 76 of the wings. The major portion of the adjacent wings, designated 52, will in this form in the full retracted locations be so closely adjacent each other that there is substantially no space between the pair of wings in the full retracted loations. The edges 52 are then parallel each to the other and there is no obstruction to air flow thereby. In retracted positions in the first form there is a distance only the thickness of the unit A while in the modified form FIG. 13, 14, there is no space between the two wings in retracted positions. In FIGS. 13, 14, the rear stabilizing wings 77, 78 are fixed without ability for position change, and the ailerons 79, 80 are provided with any control operation therefor.

The main wings by their form and inclinations provide the airfoil characteristics necessary for sustentation effect. The axes of pivots 56 may be inclined as may be desired in any construction to provide proper inclinations and positions of the wings. The main wings are not provided with the dual form of oscillation as in the case of the supplemental wings but may be if that may be desirable in any construction.

The main structural unit A is the chief support structure of the aircraft and as a structural member divides the fuselage into two side by side divisions which have their supporting ribs and floor members firmly attached to the structure A and the structure A has the strength and ability for support of all the aircraft structure and units into a functional unit with support by the main wings through the unit B which is firmly attached to the unit A, and the formation of the wing units of the main wings in their retracted positions provides that support in sustentation in flight with the maximum efficiency of the main wings for sustentation.

While I have shown particular devices and combinations of devices in the illustration of my invention I contemplate that other detailed devices and combinations of devices may be utilized in the realization of the invention without departing from the spirit and contemplation thereof.

What I claim is:

1. An aircraft chief structural frame being a structural lead bearing unit for location longitudinally and centrally of the transverse width of the fuselage, the said unit having longitudinal length and vertical depth each approximately that of the aircraft fuselage and having relatively horizontal beams in plural number spaced apart vertically in the central vertical longitudinal plane of the aircraft, the unit having uniting beams spaced horizontally and between horizontal to provide support therebetween and the unit having a wing mounting structure formed therein and secured therewith for location and affixing of a wing structure, all of said designated elements being firmly secured together to form a mounting structure for fuselage enclosing structure at each side thereof and also for mounting of said wing structure and for mounting of propulsion means therewith.

2. The structure as defined in claim 1 and: an enclosing structure formed at one side of said structure as defined in claim 1 and an enclosing structure formed at the other side of said structure as defined in claim 1, the said two enclosing structures forming a fuselage structure divided centrally of the transverse width thereof; and wing sustentation means affixed to said structure named in claim 1 to by support through said structure as defined in claim 1 give sustentation support in flight to said fuselage structure.

3. The structure as defined in claim 1 and: girders located transversely of said structure as defined in claim 1 and secured therewith; an enclosing structure formed at one side of said structure defined in claim 1 and an enclosing structure formed at the other side of said structure defined in claim 1, the said girders supplying support to said enclosing structures between all said structures, the said enclosing structures forming a fuselage structure divided centrally and longitudinally thereof by said structure defined in claim 1 and forming sustentation support through the vertical structure dividing said fuselage structure; the latter having thereby side by side divisions.

4. The structure as defined in claim 1 and: a pivoting structure for a pair of sustentation wings pivotally mounted in said pivoting structure to be each rotatable on the pivoting means for formation of said pair of wings in formations alternatively for flight at slow speeds as for landing flight and for flight at high speeds such as near sonic and above.

5. In variable formation wing means for aircraft, a wing mounting bearing unit fixed in a longitudinal fin fixed to and above a fuselage structure and having at each end bearing means including upper and lower bearing elements, each upper bearing element axially aligned with one lower bearing element and having formed therewith a structure unit frame to rigidly maintain each pair of axially aligned bearing elements in their relative co-axial alignment; a pair of airfoil wings each having a wing spar and a crank arm formed to be rigidly together and each wing having ability for rotation on pivot means with rotation axis in an associated pair of the bearing elements; motive power means associated to swing each crank arm and associated wing on the pivoting axis.

6. The means as defined in claim 5 and; the said motive power means composed of a pair of fluid actuated piston means each piston means including a cylinder and reciprocable piston therein, one such forwardly of the bearing elements, one rearwardly of the bearing elements, each piston of a piston means having connection with one of said crank arms to force the rotation movement for change of formation; and fluid supply and control therefor to effect a related directional movement.

7. A control airfoil means for aircraft, a unit mounting for an airfoil including a fixed bearing on an aircraft structure, an axis shaft rotatively mounted in the fixed bearing to have an axis transversely of the longitudinal axis of the aircraft and having formed therewith an airfoil pivot bearing; the control airfoil having at one end bearing in the pivot bearing; a motive power means operatively connected with the control airfoil to swing it in a plane transversely of the longitudinal direction of flight, and a secondary motive power means operatively connected with the axis shaft to rotate it and its attached control airfoil on the axis of the axis shaft; and fluid supply means to each said motive power means to actuate it and a control for the fluid supply means to procure in either motive power means a selected action.

* * * * *